(12) United States Patent
Haendeler et al.

(10) Patent No.: US 6,372,865 B1
(45) Date of Patent: Apr. 16, 2002

(54) METHOD AND DEVICE FOR EXTRACTING RUBBER FROM GASEOUS PHASE POLYMERIZATION

(75) Inventors: Friedrich Haendeler, Bergisch Gladbach; Heiko Herold, Neuss; Franz-Josef Mersmann, Bergisch Gladbach; Klaus Schebesta, Leverkusen; Jürgen Schneider, Köln; Norbert Schweigler, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/509,925
(22) PCT Filed: Oct. 1, 1998
(86) PCT No.: PCT/EP98/06231
  § 371 Date: Apr. 4, 2000
  § 102(e) Date: Apr. 4, 2000
(87) PCT Pub. No.: WO99/19373
  PCT Pub. Date: Apr. 22, 1999

(30) Foreign Application Priority Data

Oct. 10, 1997 (DE) .......................................... 197 44 708

(51) Int. Cl.[7] .................................................. C08F 2/34
(52) U.S. Cl. ........................ 526/67; 526/901; 528/502 R
(58) Field of Search ................. 526/67, 901; 528/502 R

(56) References Cited

U.S. PATENT DOCUMENTS

| | | | |
|---|---|---|---|
| 3,023,203 A | 2/1962 | Dye | 260/94.9 |
| 4,958,006 A | 9/1990 | Bernier et al. | 528/501 |
| 5,928,612 A | 7/1999 | Chinh | 422/145 |
| 5,929,180 A | 7/1999 | Chinh | 526/68 |

OTHER PUBLICATIONS

Ullmanns Encyklopädie der Technischen Chemie, vol. 19, (month unavailable), 1980, pp. 186–193, "Polyolefine".

*Primary Examiner*—David W. Wu
*Assistant Examiner*—William K Cheung
(74) *Attorney, Agent, or Firm*—Joseph C. Gil; Noland J. Cheung

(57) ABSTRACT

The present invention relates to a process for the continuous discharge of pre-classified polymer particles, particularly rubber particles, from a gas phase polymerization reactor, comprising the steps of classifying the polymer in a classifier, discharging the particles with a sufficient size and conveying the undersized particles back into the gas phase polymerization reactor.

12 Claims, 2 Drawing Sheets

FIG. 3 I-I

METHOD AND DEVICE FOR EXTRACTING RUBBER FROM GASEOUS PHASE POLYMERIZATION

FIELD OF THE INVENTION

The present application relates to a device and to a process for the continuous discharge of pre-classified rubber particles from a gas phase polymerization reactor.

BACKGROUND OF THE INVENTION

A The no polymerization of polyolefins in the gas phase is a process which is by no means new and was carried out for the first time on an industrial scale as early as 1968 (Ullmanns Encyclopaedia of Industrial Chemistry, 4th edition 1980, vol. 19, p. 186 ff)

In this process, the actual polymerization reaction takes place in a fluidized bed reactor which is composed of a reaction zone and an overlying calming zone in which the solids particles are largely separated from the gas phase. The monomers, the catalyst and possible additives such as, e.g., additives or fillers, are introduced into the reaction zone. In order to maintain a fluidized bed, a circulating gas stream is fed to the reactor from below. This circulating gas stream, which is composed substantially of the unreacted monomers, is drawn off again at the top of the reactor, residual particles are removed, the gas is cooled and returned to the reactor. The polymer produced is discharged continuously or batchwise from the reaction zone and undergoes further treatment.

Several processes for discharging polymers from a gas phase polymerization reactor are known from the prior art.

According to U.S. Pat. No. 3,023,203, for example, the discharge of polymer particles from a gas phase polymerization reactor is carried out with an extruder. The extruder is joined to the lower end of the polymerization reactor by means of a pipe.

A process for discharging polymers from a gas phase polymerization reactor with a screw extruder is known from EP-A-0 348 907, which extruder is joined to the gas phase reactor either directly or by means of a receiving vessel.

Both procedures have the disadvantage that all the particles, regardless of their size, which collect at the lower end of the reactor, are discharged without being classified.

Moreover, a process for discharging polymer particles from a gas phase react or is known from EP-A-0 728,771, wherein,the particles are discharged batchwise by means of two cycled rotary feeders. This process also has the disadvantage that the polymer particles are discharged without being classified. Moreover, due to the cycled discharge of the polymer particles, pressure fluctuations in the gas phase reactor occur with this process.

SUMMARY OF THE INVENTION

The object was, therefore, to provide a,process for the continuous discharge of pre-classified polymer particles frog a gas phase polymerization reactor which does not, have the disadvantage of the prior art. Further object of the present invention is to provide a device for the continuous discharge of pre-classified polymer particles from a gas phase polymerization reactor.

BRIEF DESCRIPTION OF THE DRAWINGS

FIG. 3 shows a cross-section of the zigzag classifier.

DETAILED DESCRIPTION OF THE INVENTION

Figure 1:
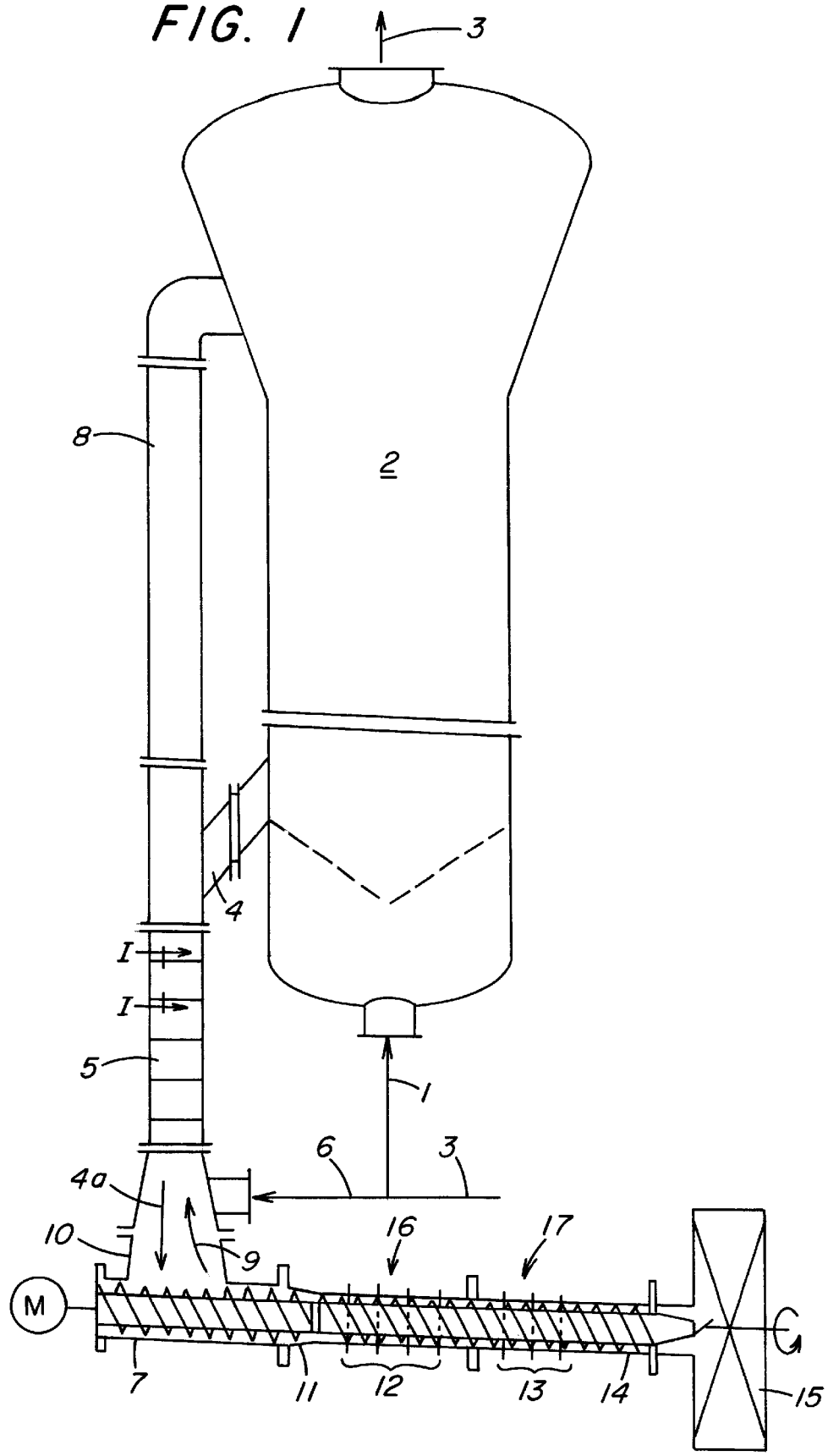
FIG. 1 shows the process according to the present invention in conjunction with a gas phase polymerization reactor.

According to the invention, the object is achieved by providing a process for the continuous discharge of pre-classified rubber particles from a gas phase polymerization reactor wherein the polymer particles are classified in a classifier, the particles with a sufficient size are then removed with a screw feeder in a preferred embodiment and the undersized particles are conveyed back to the gas phase polymerization reactor: In this case, the screw assumes the function of a pressure feeder. At the same time, the screw serves to remove the pore gas from the particles discharged and the pore gas removed can be recycled to the reaction zone.

Riser pipe classifiers which are operated with a partial gas stream, or any other counter current gravity classifier known to the expert in the art which is suitable for classifying sticky polymer particles, are used to examine the bed content. In a preferred embodiment, a zigzag classifier is used. Said classifier may be arranged laterally next to the reactor and may have a square or rectangular cross-section with a height-width ratio of a maximum of 5 to 1. In a further embodiment, the zigzag classifier is situated centrally at the lowest point of a conical reactor bottom. In this case it has an annular cross-section.

The classifying gas velocity depends on the particle size and density of the polymer particle to be discharged. The flow rate is preferably between 0 and 2 m/s, particularly preferably between 0.4 and 1.5 m/s.

In the process according to the invention, the classifier is operated at a pressure corresponding at least to the pressure in the gas phase polymerization reactor. The classifier is, however, operated preferably at 0 to 30 bar, particularly preferably 2 to 8 bar above atmospheric.

In the process according to the invention, the screw feeder used is preferably a single or twin-screw extruder. The screw extruder must have at least one so-called baffle by means of which is generated at least the pressure also prevailing in the classifier. Screw extruders are available commercially e.g. from Berstorff.

In a preferred embodiment of the process according to the invention, the screw extruder also has at least one mixing zone, an extrusion zone and a granulator.

Deactivating agents and additives and/or a blowing agent are preferably added to the rubber before or in the mixing zone. Particularly preferably, deactivating agents and additives and/or a blowing agent are added to the rubber immediately before the mixing zone. Deactivating agents and additives within the meaning of the invention are, e.g., substituted or unsubstituted stearic acids, salts of the substituted or unsubstituted stearic acids, substituted or unsubstituted organic acids salts of the substituted or unsubstituted organic acids, water, alcohols, release agents, antistatic agents, stabilizers, antioxidants, antiozonants, solvents, fillers or mixtures of the said substances.

More particularly preferably, the blowing agent used is water. Water is added to the rubber preferably in a quantity of 0 to 15%, particularly preferably 4 to 8%. Due to the explosive evaporation of the water at the screw outlet, the surface area of the rubber is increased and thus the degassing of residual monomers from the polymer particles is promoted. Moreover, a porous polymer material may thereby be obtained.

Polymer particles of any kind produced in the gas phase, particularly preferably rubber particles of any kind, may be discharged with the process according to the invention.

Polymers within the meaning of the invention are, e.g., poly α-olefins, polyisoprene, polystyrene, SBR, IIR, polyisobutene, polychloroprene, silicones and copolymers of ethylene and one or more of the following compounds: acrylonitrile, malonic esters, vinyl acetate, acrylic and methacrylic esters, vinyl acetate, acrylic and methacrylic esters, α-olefins, dienes, and trienes.

Rubbers within the meaning of the invention are uncrosslinked but crosslinkable polymers which may be converted to the rubbery-elastic state by crosslinking.

The process according to the invention is used preferably, however, to discharge EPM, EPDM, SBR, ABS, NBR, polyisoprene and BR from gas phase polymerization.

The process according to the invention can be carried out particularly well in a zigzag classifier and in a screw feeder.

Consequently, a device for the continuous discharge of pre-classified rubber particles from a gas phase polymerization reactor composed of a zigzag classifier and a downstream screw feeder is also claimed.

The process according to the invention has the advantages that only particles with a certain size are discharged. The costs of further treatment are thereby reduced. Moreover, the zigzag classifier does not become glued up by the rubber. Due to the fact that the classifier is under the same pressure as the gas phase polymerization reactor, the particles and the gas stream which is conveyed back into the reactor do not have to be compressed again.

DESCRIPTION OF FIGURES

The invention and further advantages are explained below on the basis of FIGS. 1 to 3.

The process according to the invention is shown in FIG. 1. Polymerization of 1,3-butadiene to polybutadiene takes place in the gas phase polymerization reactor 2. The buta-1,3-diene is introduced by way of the circulating gas stream 1 into the reactor 2. Here the polymerization reaction takes place and the circulating gas stream 3 depleted in buta-1,3-diene is drawn off at the top of the reactor, purified, enriched with fresh buta-1,3-diene and recycled to the reactor. The sticky polybutadiene particles are drawn off by means of line 4 and fed to the zigzag classifier 5. The zigzag classifier is operated with a part of the circulating gas stream 6 which is fed into the classifier from below. The polymer particles are classified in the classifier. Those particles 4a which exceed a certain size fall into the inlet of screw extruder 7. The other particles are entrained with the classifying gas and recycled via line 8 to the gas phase polymerization reactor 2.

In the screw extruder 7 interstitial gas 9 is first removed from the polymer particles, which gas is drawn off via line 10.

The screw extruder is composed of a feed zone, a flow restriction zone 11, four mixing planes 12, two farther mixing planes 13 and an extrusion zone 14. The screw extruder is followed by a granulator.

Stearic acid (16 wt. % in hexane) and commercially available antioxidants such as, e.g., Vulkanox BKF from Bayer AG are metered into the mixing zones 12 via line 16. Water is added to the mixing zone 13 via line 17. Due to the explosive evaporation of the water at the screw outlet, the surface area of the rubber is increased and the degassing of residual monomers from the polymer particles is thus promoted. Moreover, a porous polymer material can thereby be obtained.

The material is then comminuted to a desired size in the granulator.

Figure 2:
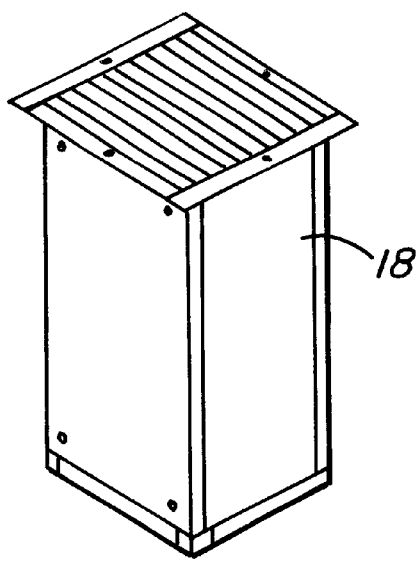
FIG. 2 shows the perspective view of the zigzag classifier.
Figure 2:
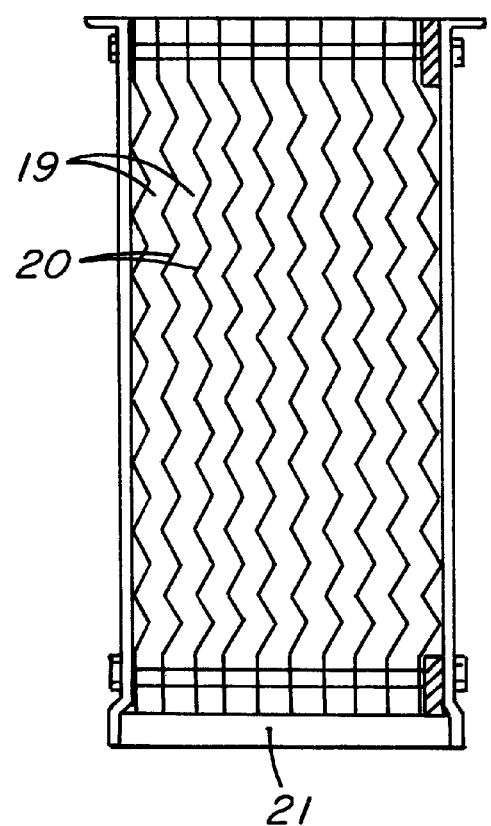

As can be derived from FIGS. 2 and 3, the zigzag classifier 18 is composed of a plurality of straight rectangular channels which butt up against each other at an angle of about 120°. The channels 19 are confined by zigzagged channelled plates 20. A gas distributor 21 is arranged at the lower end of the zigzag classifier by means of which the same amount of gas is fed to all the classifier channels. An eddy forms in each classifier element, this term meaning here the distance between two adjacent classifying sites. The material to be classified slides down on the lower surface in each case, passes through the stream of classifying gas, moves upwards on the upper surface in each case and again passes through the stream of classifying gas. Classification takes place during each passage, so that a very high separation effect is obtained on the whole.

The classifier has an adjustable cross-section. The required minimum cross-section must be defined by experiment because it depends on the particle size distribution of the fluidized bed in the reactor and that of the material to be discharged. The adjusting device is composed of bars joined together in a chamber-like fashion and adjusted to the zigzag profile, which bars can be pushed crosswise by means of propulsion 15, i.e. perpendicular to the classifier axis.

What is claimed is:

1. A process for the continuous discharge of pre-classified polymer particles, particularly rubber particles, from a gas phase polymerization reactor, comprising the steps of classifying the polymer particles in a classifier, discharging the particles with a sufficient size and conveying the undersized particles back into the gas phase polymerization reactor.

2. A process for the continuous discharge of pre-classified polymer particles according to claim 1, wherein the particles with a sufficient size are then discharged with the screw feeder.

3. A process for the continuous discharge of polymer particles according to claim 2, wherein the classifier is a zigzag classifier which is operated at the same pressure as the gas phase polymerization reactor.

4. A process for the continuous discharge of polymer particles according to claim 2 wherein the screw feeder is a single or twin-screw extruder.

5. A process for the continuous discharge of polymer particles according to claim 4, wherein the screw extruder comprises a baffle and at least one mixing zone, an extrusion zone and a granulator.

6. A process for the continuous discharge of polymer particles according to claim 5, wherein additives and/or blowing agents and/or deactivating agents are added before or in the mixing zone.

7. A process for the continuous discharge of polymer particles according to claim 6, wherein the blowing agent is water.

8. A process for the continuous discharge of polymer particles according to claim 1, wherein the polymer particles are selected from the group consisting of EPM, EPDM, polyisoprene, SBR and BR.

9. A process for the continuous discharge of polymer particles according to claim 1, wherein the polymer particles have been polymerized in the presence of fillers or extenders such as carbon black, silica, talc, clay or ground polyolefins.

10. A process for the continuous discharge of polymer particles according to claim 1, wherein the polymer particles have been polymerized at reactor temperatures below the dew point of one of the monomers or inert gases used.

11. A process for the continuous discharge of polymer particles according to claim 1, wherein the polymer particles have been polymerized in the presence of fillers or extenders such as carbon clack, silica, talc, clay or ground polyolefins, and said filler or extender which is separated is recycled to the reactor.

12. A process for the continuous discharge of non-sticky, pre-classified polymer particles from a gas phase polymerization reactor comprising the steps of, classifying the polymer particles in the classifier, discharging the particles with a sufficient size with the screw feeder and conveying the undersized particles back into the gas phase polymerization reactor.

* * * * *